United States Patent [19]

Anderton et al.

[11] Patent Number: 4,512,773
[45] Date of Patent: Apr. 23, 1985

[54] CATIONIC TRIPHENDIOXAZINE DYES, METHODS FOR THEIR MANUFACTURE AND THEIR USE FOR DYEING CELLULOSIC SUBSTRATES

[75] Inventors: Kenneth Anderton; Nigel Hall; Brian Parton; Andrew H. M. Renfrew, all of Lancashire; Malcolm G. Shaw, Stirlingshire, all of England

[73] Assignee: Imperial Chemical Industries PLC, London, England

[21] Appl. No.: 493,262

[22] Filed: May 10, 1983

[30] Foreign Application Priority Data

May 24, 1982 [GB] United Kingdom ............. 8215052

[51] Int. Cl.$^3$ .................. C09B 19/02; D06P 3/58
[52] U.S. Cl. ........................... 8/657; 8/436; 8/655; 8/918; 8/919; 544/74
[58] Field of Search ............... 8/657, 655; 544/74

[56] References Cited

U.S. PATENT DOCUMENTS

| | | | |
|---|---|---|---|
| 2,016,504 | 10/1935 | Kranzlein et al. | 544/74 |
| 2,026,092 | 12/1935 | Kranzlein et al. | 544/74 |
| 2,082,344 | 6/1937 | Kranzlein et al. | 544/74 |
| 3,892,742 | 7/1975 | Parton | 544/74 |
| 3,996,221 | 2/1976 | Leng et al. | 200/246 R |
| 4,336,377 | 6/1982 | Adam et al. | 8/655 |
| 4,395,545 | 7/1983 | Adam et al. | 544/74 |

FOREIGN PATENT DOCUMENTS

| | | |
|---|---|---|
| 1116564 | 5/1956 | France . |
| 781384 | 8/1957 | United Kingdom . |
| 850159 | 9/1960 | United Kingdom . |
| 1028916 | 5/1966 | United Kingdom . |
| 1368158 | 9/1974 | United Kingdom . |
| 1384749 | 2/1975 | United Kingdom . |
| 2019872 | 11/1979 | United Kingdom . |
| 2059985 | 4/1981 | United Kingdom . |

*Primary Examiner*—A. Lionel Clingman
*Attorney, Agent, or Firm*—Cushman, Darby & Cushman

[57] ABSTRACT

A dyestuff of formula:

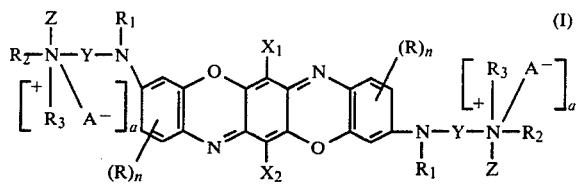

wherein: the groups $X_1$ and $X_2$ are independently hydrogen, halogen, alkyl, aryl, alkoxy, cyano, optionally substituted amino or carboxylic acid ester groups; $(R)_n$ represents n substituents R each of which is independently halogen, lower alkyl, lower alkoxy or —COOH and n is 0 or 1; $R_1$ is hydrogen, or optionally substituted lower alkyl; Y is an optionally substituted aliphatic or optionally substituted araliphatic group; $R_2$ is hydrogen, optionally substituted lower alkyl, optionally substituted aryl or optionally substituted aralkyl; $R_3$ is hydrogen or an optionally substituted alkyl or aralkyl group; $A^-$ is an anion; a is 0 or 1; and Z is hydrogen, optionally substituted lower alkyl, optionally substituted aryl or optionally substituted aralkyl.

The dyes are useful for the coloration of materials such as textiles, leather, inks and lacquers.

9 Claims, No Drawings

CATIONIC TRIPHENDIOXAZINE DYES, METHODS FOR THEIR MANUFACTURE AND THEIR USE FOR DYEING CELLULOSIC SUBSTRATES

This invention relates to triphendioxazine dyes, to methods for their manufacture and to their use for dyeing cellulosic substrates.

According to the present invention there is provided a dyestuff of formula:

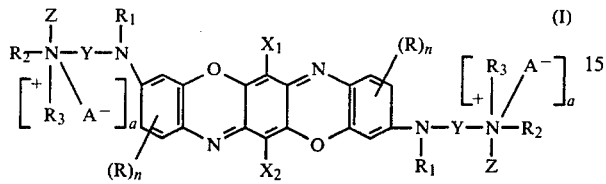

wherein:

the groups $X_1$ and $X_2$ are independently hydrogen, halogen, alkyl, aryl, alkoxy, cyano, optionally substituted amino or carboxylic acid ester groups;

$(R)_n$ represents n substituents R each of which is independently halogen, lower alkyl, lower alkoxy or —COOH and n is 0 or 1;

$R_1$ is hydrogen, or optionally substituted lower alkyl;

Y is an optionally substituted aliphatic or optionally substituted araliphatic group;

$R_2$ is hydrogen, optionally substituted lower alkyl, optionally substituted aryl or optionally substituted aralkyl;

$R_3$ is hydrogen or an optionally substituted alkyl or aralkyl group;

$A^-$ is an anion;

a is 0 or 1; and

Z is hydrogen, optionally substituted lower alkyl, optionally substituted aryl or optionally substituted aralkyl.

The term "lower alkyl" as used herein means an alkyl group having from 1 to 6 carbon atoms. In general, lower alkyl groups having from 1 to 4 carbon atoms are preferred.

The groups $X_1$ and $X_2$ are both preferably halide, for example chloride.

In the groups $(R)_n$, n is preferably 0 or when n is 1, the groups R are preferably the same and R is preferably a halide group, especially chloride.

$R_1$ is preferably hydrogen or methyl.

As examples of groups represented by Y there may be mentioned ethylene, 1,2- and 1,3-propylene, 2-hydroxy-1,3- propylene, 1- and 2-phenyl-1,3-propylene, 2-(4'-sulphophenyl)- 1,3-propylene, 1,4-, 2,3- and 2,4-butylene, 2-methyl-1,3-propylene, 2-methyl-2,4-pentylene, 2,2-dimethyl-1,3-propylene, 1-phenylethylene, 1-chloro-2,3-propylene, 1,6- and 2,5-hexylene, 2,3-diphenyl-1,4-butylene, 1(methoxycarbonyl)-1,5-pentylene, 1-carboxy-1,5-pentylene, 2,7-heptylene, 3-methyl-1,6-hexylene, —CH2CH2OCH2CH2—, —CH2CH2SCH2CH2—, —CH2CH2SSCH2CH2—,

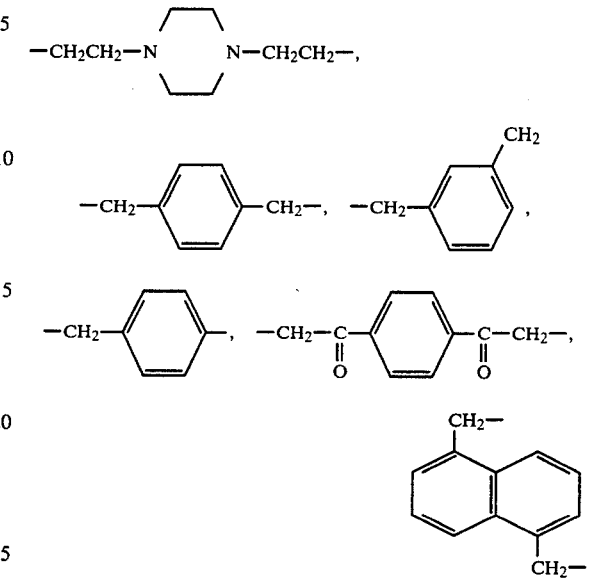

$R_1$ be linked to both nitrogen atoms in the structure: —$NR_1$—Y—$NR_2$—. As examples of such a grouping there may be mentioned

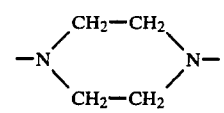

Y is preferably a linear or branched chain aliphatic group containing from 2 to 6 carbon atoms and optionally containing one or more hydroxy or alkoxy substituents, for example an ethylene or propylene group optionally containing one hydroxy or methoxy substituent.

As examples of atoms or groups represented by $R_2$ there may be mentioned hydrogen, methyl, hydroxymethyl, ethyl, hydroxyethyl, phenyl, 3- and 4-nitrophenyl, benzyl, beta-hydroxyethyl and beta-sulphatoethyl.

The dyestuffs of the present invention are conveniently prepared by de-sulphonation of the compound:

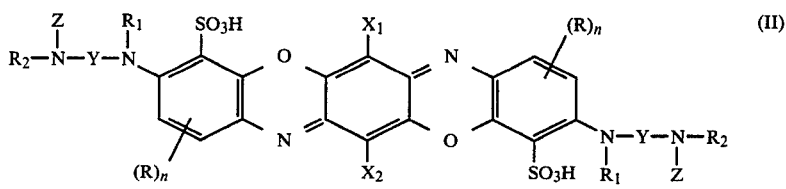

Compound (II) may be prepared as described for example in United Kingdom Patent Specification No. 1450746 by reacting 2,3,5,6-tetrachloro-1,4-benzoquinone (or the corresponding compound bearing the substituents $X_1$ and $X_2$ where these are not chlorine atoms) with 2 moles of a diamine of formula:

acid (formula III below wherein Y is —CH$_2$CH$_2$— and R$_2$ and Z are hydrogen) and 30 parts of 98% sulphuric acid was stirred at 130° C. for 1 hour.

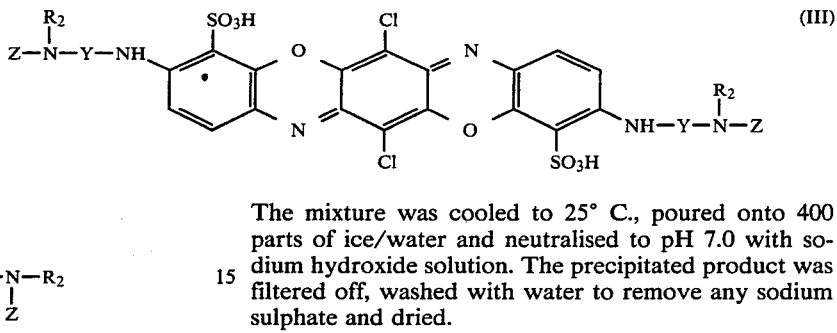

(III)

The mixture was cooled to 25° C., poured onto 400 parts of ice/water and neutralised to pH 7.0 with sodium hydroxide solution. The precipitated product was filtered off, washed with water to remove any sodium sulphate and dried.

Analysis showed the product to be 6,13-dichloro-3,10-bis(2-aminoethylamino)triphendioxazine of formula (IV) below wherein Y is —CH$_2$CH$_2$— and R$_2$ and Z are hydrogen. The mass spectrum showed a terminal ion at m/e=470 and a breakdown pattern consistent with this structure. The product dissolved in aqueous acetic acid to give a blue solution having lambda max 568 mm which dyed paper and polyacrylonitrile textile materials in reddish-blue shades. The product could also be applied to aromatic polyester textile materials, at pH 7.0.

and heating the resulting dianilide in the presence of a strongly acid condensing agent such as oleum to effect ring closure. De-sulphonation of compound (II) may be achieved by heating in the presence of a mineral acid, for example sulphuric acid, and preferably in the presence of sulphuric acid having a concentration in excess of 80% by weight. Suitable reaction temperatures are in the range of about 90° C. to 150° C.

Conversion of the dyestuff to the salt or quaternary derivative may be achieved, either before or after de-

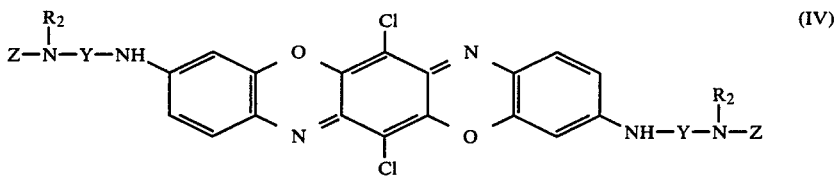

(IV)

sulphonation, by conventional means, for example by treatment with the appropriate dialkyl sulphate or alkyl iodide. If groups such as R$_2$ and Z are hydrogen, these may be converted to alkyl on treatment with the alkylating agent.

Z and R$_2$ are preferably independently hydrogen, a lower alkyl group or a lower alkyl group having a hydroxyl substituent. We have found that improved solubility in aqueous acids may be obtained when Z and R$_2$ are independently lower alkyl groups, for example methyl or ethyl, and such compounds are especially preferred. R$_3$, when present, is preferably hydrogen or a lower alkyl group. When a is 1 and R$_3$ is hydrogen, the dyestuff is the corresponding salt, and when a is 1 and R$_3$ is a lower alkyl group, the dyestuff is the corresponding quaternary derivative. The nature of the anion A$^-$ is not critical.

The new dyestuffs are basic triphendioxazine dyes of blue shades useful for the colouration of materials such as textiles, leather, inks and lacquers. The basic triphendioxazine dyestuffs have an especially high affinity for paper and backwaters from paper dyeing are frequently substantially clear. The basic triphendioxazine dyestuffs have high tinctorial strengths and good light fastness on cellulosic substrates.

The invention is illustrated by the following Examples in which all parts and percentages are by weight unless otherwise stated.

EXAMPLE 1

A mixture of 5 parts of 6,13-dichloro-3,10-bis-(2-aminoethylamino)triphendioxazine-4,11-disulphonic

EXAMPLE 2

The process of Example 1 was repeated except that the starting material had the formula of compound (III) above wherein Z and R$_2$ are both methyl and Y has the formula: —CH$_2$CH$_2$CH$_2$—.

The resultant product was a dyestuff of formula (IV) wherein Y, R$_2$ and Z have the meanings given above. The product had a lambda (max) value of 570 mm and dyed paper and polyacrylonitrile materials in reddish-blue shades.

EXAMPLE 3

The process of Example 1 was repeated except that the starting material had the formula of compound (III) above wherein Z is hydrogen, R$_2$ is —CH$_2$CH$_2$OH and Y has the formula: —CH$_2$CH$_2$—. The resultant product was a dyestuff of formula (IV) wherein Y, R$_2$ and Z have the meanings given above. The product had a lambda (max) value of 560mm and dyed paper and polyacrylonitrile materials in reddish-blue shades.

EXAMPLE 4

The process of Example 1 was repeated except that the starting material had the formula of compound (III) above wherein Z and R$_2$ are both hydrogen and Y has the formula: —CH$_2$CH$_2$CH$_2$—. The resultant product was a dyestuff of formula (IV) wherein Y, R$_2$ and Z have the meanings given above. The product had a lambda (max) value of 560 mm and dyed paper and polyacrylonitrile materials in reddish-blue shades.

EXAMPLE 5

25 parts of the starting material of Example 1 was stirred with 600 parts of water at 35° to 40° C. and the pH was adjusted to 10.5. 12 Parts of dimethyl sulphate was added and the mixture was stirred at pH 10.5 for 1½ hours. The pH was adjusted to 8 and the solid was isolated by filtration, washed with water and dried to give 16 parts of a dark blue solid.

A mixture of the above solid and 80 parts of concentrated sulphuric acid was stirred at 130° C. for 1 hour. On cooling to 25° C., the mixture was poured into 1600 parts of ice/water and the pH was adjusted to 7.0 with sodium hydroxide. Salt was added to precipitate the product which was isolated by filtration to give 10 parts of cationic dyestuff whose structure was that of formula I wherein $X_1$ and $X_2$ are both chlorine, $R_1$ is hydrogen, $R_2$, $R_3$ and Z are all methyl, n is 0, Y is —$CH_2CH_2$—, a is 1 and $A^-$ is $Cl^-$.

The product dissolved in water to give a blue solution having a lambda max value of 565 mm which dyed paper and polyacrylonitrile materials in reddish-blue shades.

EXAMPLES 6 to 13

Dyes of formula (I) which may be prepared using the method of Example 1 when a is 0 and the method of Example 6 when a is 1 are listed in Table 1. Approximate values for lambda max are given for each dye.

TABLE I

| Substituent in Formula I | EXAMPLE No. | | | | | | | |
|---|---|---|---|---|---|---|---|---|
| | 6 | 7 | 8 | 9 | 10 | 11 | 12 | 13 |
| R | — | — | — | — | — | Cl | Cl | Cl |
| n | 0 | 0 | 0 | 0 | 0 | 1 | 1 | 1 |
| $R_1$ | H | H | H | H | H | H | H | $CH_3$ |
| Y | —$CH_2CHOHCH_2$— | $(CH_2)_2$ | $(CH_2)_2$ | $(CH_2)_3$ | $(CH_2)_3$ | $(CH_2)_2$ | $(CH_2)_3$ | $(CH_2)_2$ |
| $R_2$ | H | H | $CH_2CH_2OH$ | $C_2H_5$ | $CH_3$ | H | $CH_3$ | $CH_3$ |
| $R_3$ | — | — | — | — | — | — | — | $CH_3$ |
| Z | H | H | H | $C_2H_5$ | $CH_3$ | H | $CH_3$ | $CH_3$ |
| a | 0 | 0 | 0 | 0 | 0 | 0 | 0 | 1 |
| $A^-$ | — | — | — | — | — | — | — | Cl |
| $X_1$ | Cl | Br | Br | Cl | Br | Cl | Cl | Cl |
| $X_2$ | Cl | Br | Br | Cl | Br | Cl | Cl | Cl |
| λmax (nm) | — | 562 | 558 | 571 | 566 | 564 | 568 | 552 |

We claim:

1. A triphendioxazine dyestuff of blue shade having the formula:

(I)

[structure of formula (I) showing triphendioxazine with substituents Z, $R_1$, $R_2$, Y, N, $(R)_n$, $X_1$, $X_2$, O, and $[R_3\ A^-]_a$ groups]

wherein
 $X_1$ and $X_2$ are both halogen;
 $(R)_n$ represents n substituents R each of which is independently halogen and n is 0 or 1;
 $R_1$ is hydrogen or a lower alkyl group;
 Y is a linear or branched aliphatic group containing from 2 to 6 carbon atoms and optionally containing one or more hydroxy or alkoxy substituents;
 $R_2$ is hydrogen, lower alkyl, hydroxy substituted lower alkyl, phenyl, 3- or 4- nitrophenyl, benzyl or beta-sulphatoethyl;
 $R_3$ is hydrogen or a lower alkyl group;
 $A^-$ is an anion and a is 1 or 0; and
 Z is hydrogen or a lower alkyl group.

2. A dyestuff according to claim 1 wherein $X_1$ and $X_2$ are both chlorine; n is 0; $R_1$ is hydrogen or methyl, Y is a linear or branched aliphatic group containing from 2 to 6 carbon atoms; $R_2$ is hydrogen, lower alkyl or hydroxy substituted lower alkyl; $R_3$ is hydrogen or lower alkyl, $A^-$ is an anion and a is 1 or 0; and Z is hydrogen or a lower alkyl group.

3. A dyestuff according to claim 1 wherein $X_1$ and $X_2$ are both chlorine; n is 0; $R_1$ is hydrogen; $R_2$ is hydrogen or lower alkyl; Y is ethyl or propyl; a is 0; and Z is hydrogen or a lower alkyl group.

4. A dyestuff according to claim 3 wherein $R_2$ and Z are both lower alkyl.

5. A dyestuff according to claim 4 wherein $R_2$ and Z are both methyl.

6. A dyestuff according to claim 1 wherein $X_1$ and $X_2$ are both chlorine; n is 0; $R_1$ is hydrogen or lower alkyl; $R_2$ is lower alkyl; Y is ethyl or propyl; a is 1; $R_3$ is lower alkyl and Z is lower alkyl.

7. A process for the manufacture of a dyestuff according to claim 1 which comprises de-sulphonation of a compound of formula:

(II)

[structure of formula (II) showing the sulphonated precursor compound with $SO_3H$, $X_1$, $X_2$, $(R)_n$, Z, $R_1$, $R_2$, Y, N, and O groups]

by heating in the presence of a mineral acid.

8. A process according to claim 7 wherein the mineral acid is sulphuric acid having a concentration in excess of 80% by weight and the reaction temperature is in the range of 90° to 150° C.

9. A process for dying cellulosic substrates using a dyestuff according to any of claims 1 to 6.

* * * * *